United States Patent [19]

Meiners

[11] 4,068,612

[45] Jan. 17, 1978

[54] TURBOCHARGER HOUSING CONSTRUCTION FOR MARINE TURBOCHARGER AND DEVICE FOR TURBOCHARGING A MARINE ENGINE

[75] Inventor: Elmo R. Meiners, Anchor, Ill.

[73] Assignee: M & W Gear Company, Gibson City, Ill.

[21] Appl. No.: 719,848

[22] Filed: Sept. 2, 1976

Related U.S. Application Data

[63] Continuation-in-part of Ser. No. 652,184, Jan. 26, 1976, abandoned.

[51] Int. Cl.² .............................................. B63H 21/14
[52] U.S. Cl. .......................................... 115/76; 60/605; 115/73; 115/75; 123/119 C
[58] Field of Search ................ 115/.5 R, .5 E, .5 HC, 115/76, 73, 75; 123/119 C, 119 CB, 119 CD; 60/598, 605–612, 321

[56] References Cited

U.S. PATENT DOCUMENTS

| 2,551,307 | 5/1951 | Yingling | 60/321 |
| 3,541,786 | 11/1970 | Sarra | 60/321 |
| 3,948,052 | 4/1976 | Merkle et al. | 123/119 C |

FOREIGN PATENT DOCUMENTS

| 2,252,705 | 5/1974 | Germany | 60/605 |

OTHER PUBLICATIONS

Boating, vol. 36, No. 1, Ziff–Davis Publishing Co., July, 1974, pp. 35–37, and 62.

Primary Examiner—Trygve M. Blix
Assistant Examiner—Sherman D. Basinger
Attorney, Agent, or Firm—Allegretti, Newitt, Witcoff & McAndrews

[57] ABSTRACT

An improved turbocharger for marine engines includes a water jacket which insulates or shields the heated turbocharger from the engine compartment. Preheated water is directed from a water jacket for the exhaust manifold, through the special design turbocharger housing and finally through the exhaust gas duct.

7 Claims, 5 Drawing Figures

TURBOCHARGER HOUSING CONSTRUCTION FOR MARINE TURBOCHARGER AND DEVICE FOR TURBOCHARGING A MARINE ENGINE

CROSS REFERENCE TO RELATED APPLICATION

This is a continuation-in-part application of Ser. No. 652,184 filed Jan. 26, 1976, now abandoned.

BACKGROUND OF THE INVENTION

This invention relates to a turbocharger for marine engines.

One of the biggest factors limiting the power output of an internal combustion engine is its capacity to pump air into its cylinders. Combustible fuel needs the oxygen contained in air to create the combustion reaction. For a given amount of air pulled into a naturally aspirated internal combustion engine cylinder, only a certain amount of fuel can be burned efficiently. If more fuel is provided in the cylinder than necessary, it will be wasted unless more air is forced into the cylinder to support efficient combustion.

It is possible to force air into an engine cylinder by the process of supercharging. Supercharging is the process of compressing the fresh outside air before it enters the cylinders. By supercharging, a greater weight of air is available for efficient combustion of more fuel, thus producing a greater output from the same engine displacement.

There are two general methods of supercharging an internal combustion engine. In one case, a mechanically driven blower is used to compress the intake air before it enters the cylinder. Power to drive this blower is taken off the engine crank shaft usually through a gear train.

Another method of supercharging is to use a turbocharger. A turbocharger utilizes the energy in the exhaust gases coming from the cylinders to drive a compressor and compress the intake air. A turbocharger takes no power away from the crank shaft. In addition, a turbocharger utilizes energy in the exhaust gases that would otherwise be lost. Generally, the design of a turbocharger is mechanically more simple than a mechanical supercharger or blower. Bearing loads are less. Gear trains are eliminated.

Turbocharging not only increases the power output of an engine, but also causes better combustion efficiency which results in more energy from the fuel available for useful work. Due to better combustion, more of the fuel is burned and the exhaust gas is cleaner. Additionally, the turbocharger may act as a muffler since the turbine blades break up exhaust noise. The turbocharger is particularly useful in combination with engines operated at high altitudes since the air is less dense at such altitudes thereby decreasing the efficiency of a naturally aspirated engine. Finally, improved combustion eliminates soot accumulations that cause fire or discharge of sparks from the exhaust.

In the past, turbocharging or supercharging engines in land vehicles such as race cars and farm vehicles have been commonplace. On the other hand, providing supercharged air for internal combustion marine engines has not been a usual practice. However, Boating Magazine, in the July 1974 issue, included an article entitled the M&W Marine Turbocharger by John Delves and Larry Kean which disclosed the concept of using turbocharging techniques for marine engines. The article disclosed that power output and fuel economy both improved as a result of utilizing a turbocharger on a marine engine.

While the marine turbocharger unit disclosed in the article has proven to be a very useful device, improvements were sought. For example, marine engines are generally confined below the water line under conditions of limited access, high temperature and low air circulation. As a result, engines of this nature tend to run "hot". Methods and devices must, therefore, be devised to decrease operating temperatures of engine compartments without adversely affecting efficiency. The engine compartment temperature should be sufficiently low in order to prevent ignition of combustible fumes in the compartment.

SUMMARY OF THE INVENTION

In a principal aspect, the present invention comprises an improved turbocharger for marine engines of the type including a compressor and a turbine. The compressor includes an impeller driven by a turbine wheel. A fluid shielded manifold is provided for the turbine housing. The turbine housing is toroidal in shape. Likewise, the fluid manifold is toroidal and includes a wall which is common with the wall of the turbine housing. The turbocharger provides compressed air to the carburation system for the engine.

It is thus an object of the present invention to provide an improved turbocharger unit for marine engines which provides compressed air to the carburation system.

It is a further object of the present invention to provide an improved turbocharger unit for marine engines of the type utilizing engine exhaust gases to drive the unit.

Still another object of the present invention is to provide a turbocharger unit for marine engines of economical and inexpensive design.

Another object of the invention is to provide a turbocharger construction which insulates the heat of the engine from the engine compartment.

These and other objects, advantages and features of the invention will be set forth in the detailed description which follows.

BRIEF DESCRIPTION OF THE DRAWING

In the detailed description which follows, reference will be made to the drawing comprised of the following figures.

DESCRIPTION OF THE PREFERRED EMBODIMENT

Figure 1:
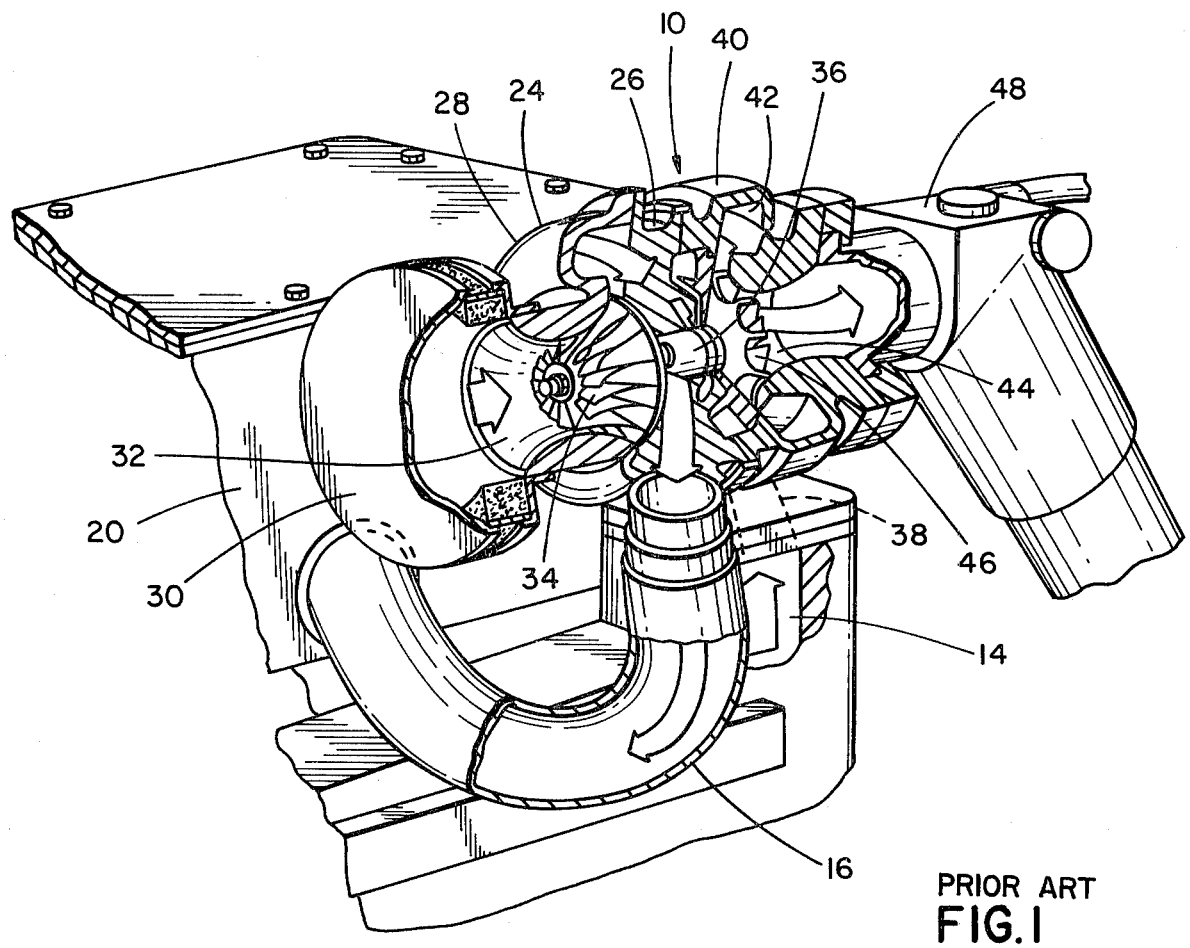
FIG. 1 is a cut-away perspective view showing a typical turbocharger construction in combination with a marine engine.
Figure 2:
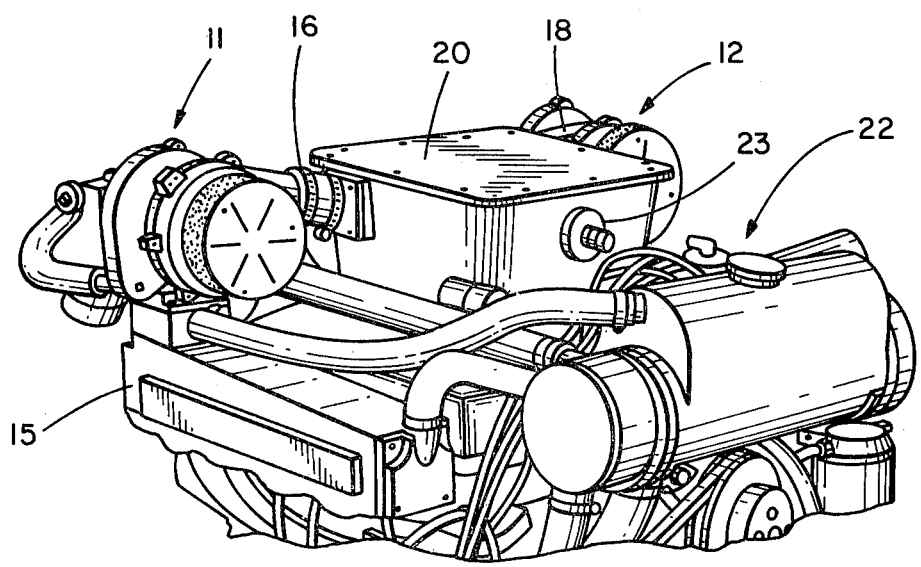
FIG. 2 is a perspective view of a typical marine engine incorporating two turbochargers, each turbocharger also including the improved water insulating structure of the present invention.

FIG. 1 illustrates the turbocharger arrangement as described in the July 1974 Boating Magazine article reference identified above. A marine turbocharger is generally designated as turbocharger 10. The turbocharger 10 is attached to or mounted on an exhaust manifold 14. The turbocharger 10 illustrated in FIG. 1 is comprised of a compressor 24 which includes a bearing plate 26 and a compressor housing 28. Air enters the air cleaner 30, flows into passage 32 where it is compressed by action of an impeller 34. Impeller 34 is mounted on a shaft maintained in bearings 36 provided in bearing plate 26. Compressed air then passes through outlet line 16 into a carburation enclosure 20.

Exhaust products from exhaust manifold 14 flow into an exhaust inlet 38 in a turbine housing 40 of turbocharger 10. Turbine housing 40 cooperates with plate 26 to define a toroidal cavity 42 which receives the exhaust products. The exhaust products pass from the toroidal cavity 42 inwardly toward center passage 44. In doing so, the exhaust products drive a turbine wheel 46 also attached to shaft 36. In this manner, the exhaust gases drive the impeller 34. The exhaust products then pass through exhaust discharge tube 48.

The remaining figures illustrate a turbocharger 11, 12 modified with respect to turbocharger 10 and in combination with the engine cooling system to provide an improved marine turbocharger 11, 12. Modified turbocharger 11 is mounted on modified manifold 15 in FIG. 2. In the embodiment of FIGS. 2–5, a second modified turbocharger 12 is also provided. Turbochargers 11 and 12 have compressed air outlet lines 16 and 18, respectively, leading into an air-tight carburation enclosure 20.

Figure 5:
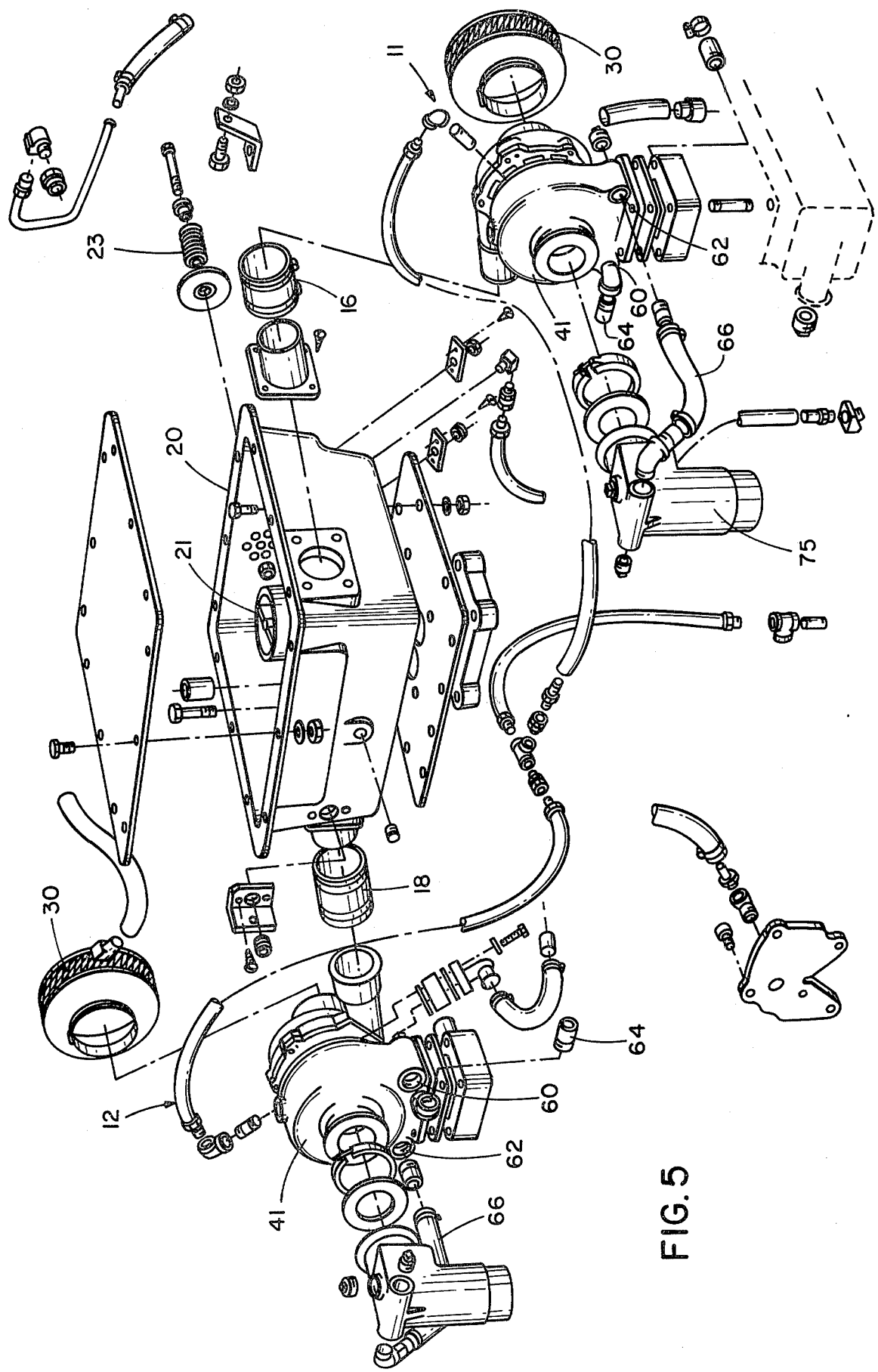
FIG. 5 is an exploded perspective view of the turbocharger assembly for the engine illustrated in FIG. 2.

A carbureter, 21 in FIG. 5, for engine 22 is maintained within the air-tight enclosure 20. Thus, compressed air is provided to the enclosure 20 where it is mixed with fuel by means of the carburetor 21. A safety relief valve 23 is provided in the side of enclosure 20. Air pressure in the enclosure is increased as a result of operation of turbochargers 11, 12 by 4 to 5 pounds per square inch. Relief valve 23 prevents over-pressurization.

The air fuel mixture from the carburetor is directed by means of an intake manifold to appropriate cylinders of the engine 22. The air fuel mixture is combusted within the cylinders and discharged as combustion or exhaust products through exhaust manifolds such as manifold 15 in FIG. 2.

The invention constitutes the additon of a fluid flow passage 50 for a turbocharger turbine housing 41 of an otherwise known turbocharger 11 and the utilization of a turbocharger turbine housing 41 having such a passage 50 in a particular manner with a marine engine. In the following description of the improved turbocharger 11, portions of the housing 41 which are the same as housing 40 have been identified with like numbers.

Figure 3:
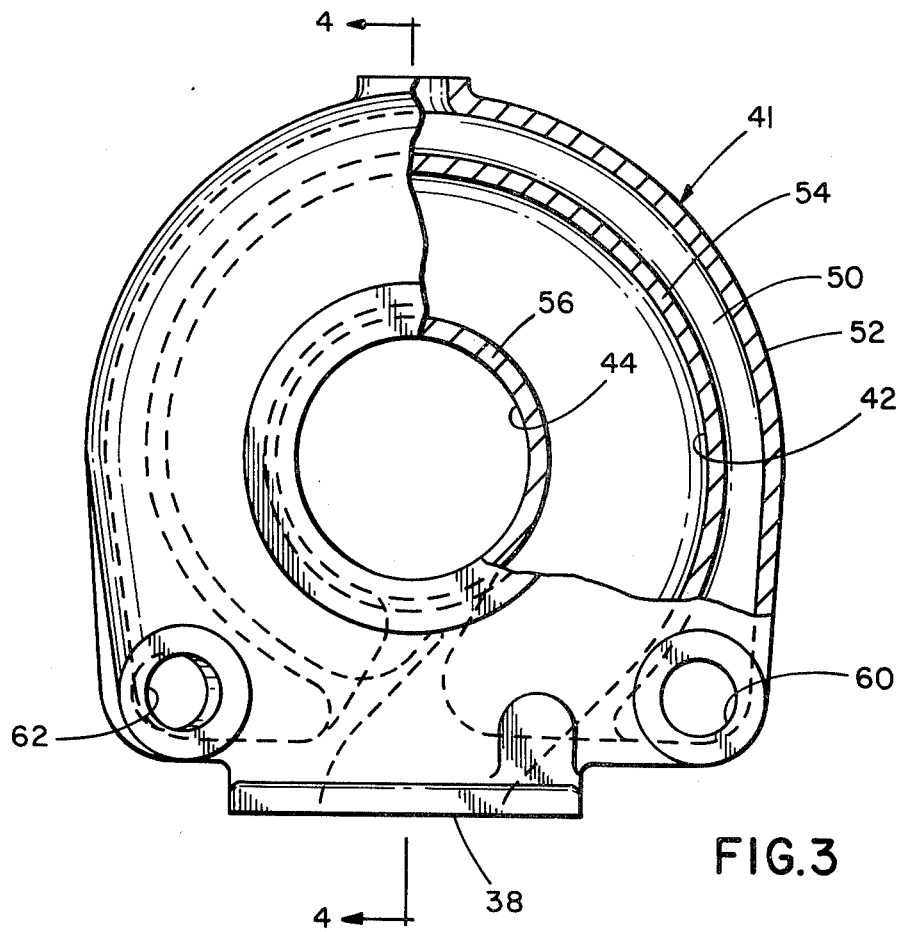
FIG. 3 is a plan view of the turbine housing of the turbocharger construction of the present invention.
Figure 4:
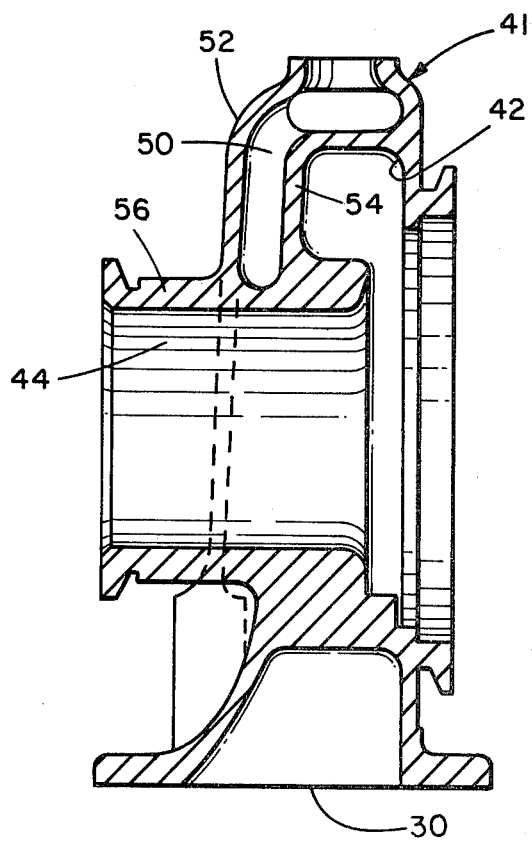
FIG. 4 is a cross section of the turbine housing of FIG. 3 taken along the line 4—4.

Referring to FIGS. 3 and 4, the construction of the improved turbine housing 41 is illustrated in greater detail. Housing 41 is generally cylindrical in shape and includes the center passage 44 defined by cylindrical wall 56. The passage wall 56 in combination with the wall 54 defines the first generally toroidal cavity or passage 42 for receipt of exhaust gases. Exhaust gases enter housing 41 through inlet 38 and exit through passage 44 as previously described.

The second toroidal passage 50 extends generally radially outward from the first passage 44 as well as laterally therefrom. The cross-sectional shape of passage 50 is such that the first passage 44 is shielded from the compartment which surrounds the marine engine installation. The second toroidal passage 50 includes a water inlet 60 substantially adjacent the exhaust gas inlet 38. The second passage 50 is thus defined by an inner wall 54 and outer wall 52. Passage 50 extends substantially circumferentially about the toroidal cavity 42 and terminates at its opposite end with a water outlet 62.

Cooling water or liquid from the engine cooling system passes through the second passage 50 to provide a heat shield between the turbocharger exhaust gases and the engine compartment. Hoses 64 and 66 in FIG. 5 are shown connected to the inlets 60 and 62 respectively for transfer of fluid through the passage of housing 41.

An important aspect of the invention relates to the path of the water through the system. That is, water is drawn into the cooling system for the marine engine from outside the boat. This feature is conventional. The water is heated as it passes through the engine block in the conventional manner cooling the engine. The heated water is then directed through the jacketed exhaust manifold 15 in FIG. 2. Subsequently, the water passes from manifold 15 through hose 64 in FIG. 5 into the passage 50 of housing 41 of turbocharger 12. Water is discharged from passage 50 through tube 66 in FIG. 5 into an exhaust outlet elbow 75. There, water mixes with the exhaust and is discharged from the boat. Note that mixing of the water with the exhaust cools the exhaust and eliminates spark and soot discharge.

Exhaust gases from the engine 22 may reach temperatures as high as 1400° F. Of course, as exhaust gas temperature increases, the energy available from such gases increases. On the other hand, engine efficiency is enhanced if the exhaust product temperature is minimized. Using the exhaust gas to drive the turbochargers 11, 12 is one way to use energy in the exhaust gases and decrease their temperature. The gases entering the turbocharger 11, 12 are not to be cooled drastically relative to their discharge temperature from the engine 22 before entering the turbocharger housing 41. On the other hand, it is very necessary to shield the exhaust gases from the engine compartment. Thus, keeping the temperature of the outside surface of the turbocharger 11 at a low temperature is very important. That is, fumes in the engine compartment could ignite or the engine compartment walls could become overheated unless some provision is made to keep the outside surface of the housing 41 at a sufficiently low temperature.

The described construction permits the outside surface of housing 41 to remain at a relatively cool temperature of 120–150° F. The housing 41 may, therefore, be touched without severe injury. The housing 41 is shielded to also eliminate spark hazard or accidental combustion of vapors in the engine compartment. Importantly, the water is heated by the engine and in the manifold 15 before entry into housing 41. Water temperature does not appreciably increase when flowing through passage 50. Typically, water temperature of water at port 60 is 130° F. and at discharge port 62 is 140° F. In this manner, the energy of the gas is then dissipated by driving the turbine wheel 46 rather than by heat transfer to the water in passage 50. The passage 50 thus serves principally as a shield or insulator while promoting maximum energy transfer from gases to wheel 46.

Another feature of the invention which prevents cracking of the housing 41 is the cross-sectional shape of cavity 50 relative to cavity 42. As shown in FIG. 4, the cavity 50 is L-shaped and surrounds cavity 42 on the two sides exposed to the engine compartment. The shape of cavity 50 avoids stress in the walls 54 and 55. Note the ratio of the cross-sectional areas of cavity 42 to cavity 50 is about 1:1. This has been determined to be the most desirable ratio, provided the relative shapes of the areas are as defined, i.e., cavity 42 is generally rectangular to square; cavity 50 is L-shaped and surrounds two sides of cavity 42.

In operation, the compressed air, as previously described, is provided to the carburation chamber 20 containing the carburetor 21 for the engine prior to addition of fuel. This promotes mixing of proper amounts of the compressed air and fuel. Also, because of this arrangement, castings and machining associated with special inlet manifolds are eliminated. In other words, some prior art structures provided for supercharging the air fuel mixture after carburation. This necessitated special fittings and manifolds associated with the air inlet to the cylinders. These components have been eliminated with the present construction. Additionally, a pressure relief valve 23 prevents overpressurization, an added safety feature.

Nevertheless the turbocharger construction of the present invention is useful in combination with systems wherein the carburetor is connected to the inlet side of the compressor housing. The turbocharged air fuel mixture is then directed to the intake manifold of the engine. Therefore, while in the foregoing preferred embodiment has been disclosed, the invention is to be limited only by the following claim and their equivalents.

What is claimed is:

1. In a turbocharger for marine engines of the type including a compressor housing, an impeller in the compressor housing, a turbine housing, a turbine wheel in the turbine housing, a drive shaft connecting the turbine wheel and impeller, the improvement of a fluid shielding manifold structure integral with the turbine housing, said turbine housing defining a toroidal passage for exhaust gases, an inlet to the toroidal passage from the engine at the outer toroid surface, an outlet from the inner toroid surface to the center passage in the housing, the center passage including the turbine wheel, a second separate substantially toroidal passage concentric with the first passage positioned radially outward from the first passage, said second passage being separated from the first passage by a wall and its opposite ends adjacent the first toroidal passage exhaust inlet to define a fluid flow path substantially surrounding the first passage, said second passage also including a cooling fluid inlet at one end and a cooling fluid outlet at the other end for connection with the fluid cooling system of the marine engine, said second passage defining an L-shaped cross-section and said first passage defining a generally rectangular cross-section bounded on only two sides by the second passage to shield the first passage, the turbine housing being attached to the compressor housing at an unshielded side of the compressor housing.

2. The improved turbocharger of claim 1 in combination with a marine engine, said engine including water cooling means, said water cooling means being connected with the cooling fluid inlet and cooling fluid outlet of the turbine housing, said engine also including carburation means and exhaust manifold means, said carburation means being connected with the compressor housing said turbine housing inlet being connected with the exhaust manifold means.

3. The improved turbocharger of claim 2 including means connecting said compressor outlet with the carburation means to provide compressed air to the carburation means prior to addition of fuel to the compressed air.

4. The improved turbocharger of claim 2 including an enclosure for the carburation means, the compressor outlet being connected to the enclosure to provide compressed air to the carburation means through the enclosure surrounding said carburation means.

5. The improved turbocharger of claim 2 wherein said engine includes a water cooled exhaust manifold, said manifold receiving inlet water from the marine engine cooling system and discharging water into the fluid inlet of the turbine housing, said fluid circulating about the turbine housing to shield the housing and then being discharged from the fluid outlet of the turbine housing.

6. The improved turbocharger of claim 5 wherein said engine includes an exhaust gas outlet, said turbine housing fluid outlet being connected with the exhaust gas outlet to direct fluid therefrom for mixing with exhaust gas.

7. The improved turbocharger of claim 1 wherein the ratio of the cross-sectional area of the toroidal passages is about 1:1.

* * * * *